No. 807,662. PATENTED DEC. 19, 1905.
M. CROWTHER.
COUPLING FOR WOODEN PIPES.
APPLICATION FILED APR. 29, 1905.

Witnesses
Benj. A. Crowther
J. R. Ehret

Inventor
Matthias Crowther

UNITED STATES PATENT OFFICE.

MATTHIAS CROWTHER, OF PITTSTON, PENNSYLVANIA.

COUPLING FOR WOODEN PIPES.

No. 807,662.  Specification of Letters Patent.  Patented Dec. 19, 1905.

Application filed April 29, 1905. Serial No. 258,066.

*To all whom it may concern:*

Be it known that I, MATTHIAS CROWTHER, a citizen of the United States of America, and a resident of Pittston, county of Luzerne, State of Pennsylvania, have invented certain new and useful Improvements in Couplings for Wooden Pipes, of which the following is a full and clear specification, reference being had to the accompanying drawings, in which—

Figure 2:
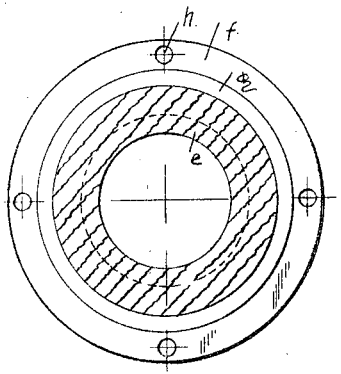
Figure 1:
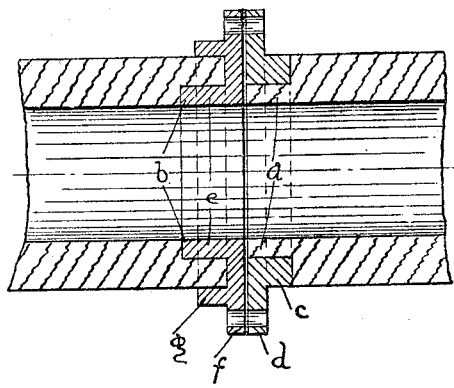
Figure 3:
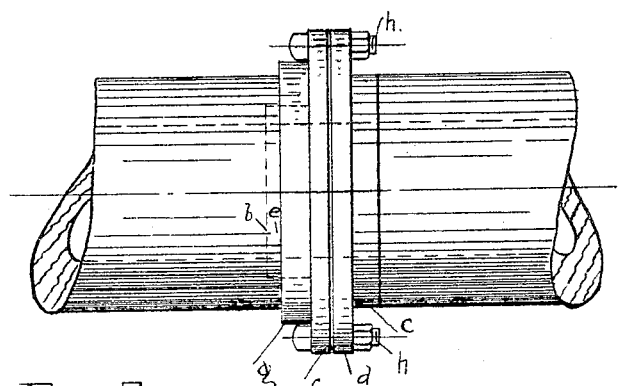
Figure 4:
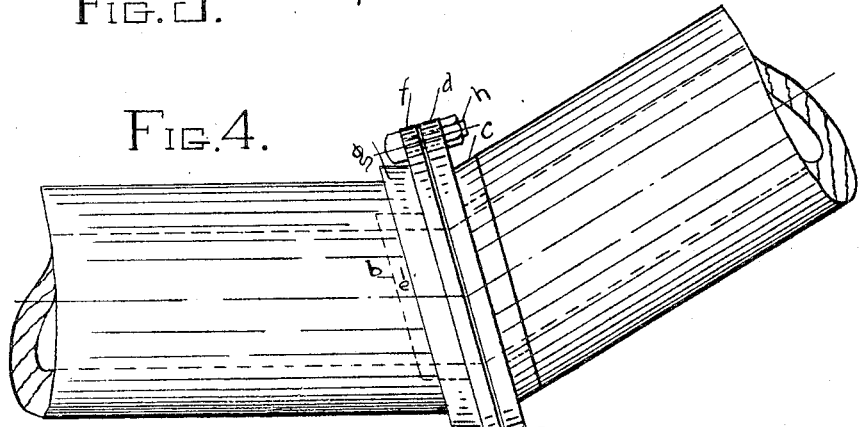
Figure 5:
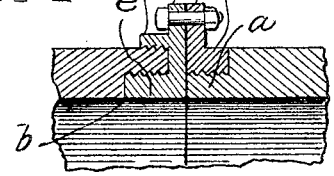

Figure 1 is a longitudinal sectional view of a joint constructed according to my invention; Fig. 2, a transverse section of the pipe adjacent to the joint; Fig. 3, a side elevation of the joint; Fig. 4, a side elevation showing a coupling adapted for use at an angle-joint. Fig. 5 is a detailed section showing a modification.

The standard wooden pipe-sections are connected at the present time by inserting the reduced end of one of the sections into a corresponding rabbet or socket in the end of the adjacent pipe. The objection to this method of connecting the pipes lies not only in the fact that the socketed end is liable to split, but also in the fact that where it is desired to remove one of the sections it is necessary, in view of the fact that disconnection can only be had by endwise movement of the sections, to remove several of the adjacent sections.

It is the object of my invention to obviate these objections by providing a simple and inexpensive metallic joint for the sections, the members constituting the joint not only embracing the adjacent ends of the sections, but also abutting against each other in such a manner that any one of the pipe-sections may be removed laterally by first removing the connecting-bolts, as more fully hereinafter set forth. To the accomplishment of this object and such others as may hereinafter appear the invention consists of the parts and combination of parts hereinafter fully described, and particularly pointed out in the appended claims, reference being had to the accompanying drawings, forming a part of this specification, in which the same reference characters designate like parts throughout the several views.

Referring to the drawings by reference characters, the letter $a$ designates the annular flange or tongue formed on the end of one of the sections by simply reducing the diameter thereof, and $b$ a similarly shaped and dimensioned rabbet or socket cut out of the inner wall of the adjacent section and which in the ordinary manner of connecting the sections would receive the annular projection $a$. Driven or screwed onto the flange $a$ is one member of the coupling, consisting of a ring $c$, which fills the recess formed by reducing the end of the pipe and is provided with an integral annular radial flange $d$. The other member of the coupling consists of a ring $e$, fitted into the socket $b$ and formed integral with an annular flange $f$, bearing against the end of the pipe-section and extending radially beyond it and provided with a supplemental flange $g$, embracing the end of the pipe and extending along its outer surface a suitable distance.

The abutting faces of the two members are without projections, as will be seen, so that any one section of the line of piping may be removed laterally without disturbing the remaining sections. Suitable bolts $h$ connect the radial flanges at points beyond the exterior of the pipe. Any suitable packing may be clamped between the members, this packing preferably extending over the end of the wooden flange $a$. It will be seen also that the two metallic members effectually prevent the ends of the wood sections from splitting, and when the members are bolted up tightly they contribute materially to the stability of the pipe-line.

If desired, the inner faces of the flanges $e$ and $g$ and the ring $c$ may be threaded or provided with barbs or annular serrations, as shown in Fig. 5, which when the members are driven or screwed into place will bite into the wood, and thereby hold the members securely to the ends of the pipe-sections and avoid the necessity of extraneous fastening devices.

It will be apparent to those skilled in the art that various mechanical embodiments of the invention are possible, and therefore I do not wish to be limited to the exact arrangement and construction shown.

What I claim, and desire to secure by Letters Patent, is—

1. In a coupling for wooden pipe-sections, the combination of two adjoining sections, one of which is provided with an internal socket in its end, and the other of which is provided with an annular flange or projection, a pair of metallic members abutting together, one member consisting of a ring fitted onto said annular projection and provided with an annular flange extending outwardly, and the other member consisting of a ring fitted into the socket of the other pipe-section and provided with an outward-extending annular flange abutting against the end of the section and provided with a supplemental flange embracing the exterior surface of the pipe, the adjacent faces of the two members abutting together and the inner edge of the member on the socketed pipe-section covering the end of the annular projection on the other section, and means for fastening the two members together through the medium of their outward-extending flanges.

2. In a coupling for wooden pipe-sections, the combination of two adjoining sections one of which is provided with an internal annular socket in its end, a pair of metallic members fitted tightly to the adjoining ends of the respective sections and one member consisting of a ring fitting tightly in said socket and provided with an outward-extending flange abutting against the end of the section, this flange being provided with a supplemental flange embracing and engaging the exterior surface of the pipe, the adjacent faces of said two members abutting together and being without obstructions, and means for fastening the two members together through the medium of their outward-projecting flanges.

In testimony whereof I hereunto affix my signature, in the presence of two witnesses, this 27th day of April, 1905.

MATTHIAS CROWTHER.

Witnesses:
  BENJ. A. CROWTHER,
  J. R. EHRET.